(12) United States Patent
Sezai (10) Patent No.: US 11,555,879 B2
(45) Date of Patent: Jan. 17, 2023

(54) OBSERVATION APPARATUS, OBSERVATION METHOD, AND PROGRAM

(71) Applicant: JAPAN AEROSPACE EXPLORATION AGENCY, Tokyo (JP)

(72) Inventor: Toshihiro Sezai, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 632 days.

(21) Appl. No.: 16/497,249

(22) PCT Filed: Mar. 22, 2018

(86) PCT No.: PCT/JP2018/011447
§ 371 (c)(1),
(2) Date: Sep. 24, 2019

(87) PCT Pub. No.: WO2018/174172
PCT Pub. Date: Sep. 27, 2018

(65) Prior Publication Data
US 2020/0379082 A1 Dec. 3, 2020

(30) Foreign Application Priority Data

Mar. 24, 2017 (JP) .............................. JP2017-058504

(51) Int. Cl.
*G01S 3/58* (2006.01)
*G01S 3/00* (2006.01)

(52) U.S. Cl.
CPC ....................................... *G01S 3/58* (2013.01)

(58) Field of Classification Search
None
See application file for complete search history.

(56) References Cited

U.S. PATENT DOCUMENTS

| 4,750,147 A | 6/1988 | Roy, III et al. |
| 5,652,827 A * | 7/1997 | Prammer ................ G01S 7/414 |
| | | 704/203 |

(Continued)

FOREIGN PATENT DOCUMENTS

| CN | 104515990 A * | 4/2015 | ............... G01S 7/41 |
| JP | 2000-101325 A | 4/2000 | |

(Continued)

OTHER PUBLICATIONS

R. Carriere et al, "High Resolution Radar Target Modeling Using a Modified Prony Estimator"; IEEE Transactions on Antennas and Propagation; vol. 40, No. 1; Jan. 1992; pp. 13-18; published by IEEE, Piscataway, NJ, USA. (Year: 1992).*

(Continued)

*Primary Examiner* — Bernarr E Gregory
(74) *Attorney, Agent, or Firm* — Saliwanchik, Lloyd & Eisenschenk (57) ABSTRACT

A signal processing unit performs, on the basis of a received electric field signal from an antenna by which a beam is scanned within a predetermined azimuthal angle and a signal of an azimuthal angle of the scanned beam, a Fourier transform on a distribution function of the received electric field signal into a frequency domain of the azimuthal angle, divides a signal according to a first spectral function by a signal according to a second spectral function, the first spectral function being obtained by performing the Fourier transform, the second spectral function being obtained by performing a Fourier transform on an antenna pattern of the antenna into a frequency domain of the azimuthal angle, and subjects the divided signal to fitting by using Prony's method with exponential functions including real parts and imaginary parts in arguments.

9 Claims, 6 Drawing Sheets

(56) References Cited

U.S. PATENT DOCUMENTS

| | | |
|---|---|---|
| 6,259,397 B1 | 7/2001 | Sezai |
| 6,392,594 B1 | 5/2002 | Sezai |

FOREIGN PATENT DOCUMENTS

| | | |
|---|---|---|
| JP | 2000-114850 A | 4/2000 |
| JP | 2017-96892 A | 6/2017 |

OTHER PUBLICATIONS

V.I. Slyusar, "Interpretation of the Proni Method for Solving Long-Range Problems"; Radioelectronics and Communications Systems; vol. 41, No. 1; 1998; pp. 35-39; published by the Kiev Polytechnic Institute; Kiev, Ukraine. (Year: 1998).*

Office Action dated Jul. 9, 2019 in Japanese Application No. 2019-506976, along with its English translation.

"16-5-1-1 Prony's method", Handbook for Digital Signal Processing [ISBN: 0-471-61995-7], 1993, pp. 1193-1195 (Document showing the well-known technology).

Inomoto, K., "Estimation of individual vehicle noise power by exponential approximation," *Acoustical Society of Japan*, 1982, 38(1):30-35.

Sezai, T., "Improvement of Directional Resolution of Rotational Radar by Prony Analysis of Deconvolved Antenna Output," *The Institute of Electronics, Information and Communication Engineers*, Aug. 17, 2017, 117(182):37-42, IEICE.

International Search Report in International Application No. PCT/JP2018/011447, filed Mar. 22, 2018.

Office Action dated May 27, 2021 in the United Kingdom Application No. 1915395.6.

\* cited by examiner

OBSERVATION APPARATUS, OBSERVATION METHOD, AND PROGRAM

CROSS-REFERENCE TO RELATED APPLICATIONS

This application is the U.S. national stage application of International Patent Application No. PCT/JP2018/011447, filed Mar. 22, 2018, which claims the benefit under 35 U.S.C. § 119 of Japanese Application No. 2017-058504, filed Mar. 24, 2017, the disclosures of each of which are incorporated herein by reference in their entirety.

TECHNICAL FIELD

The present invention relates to an observation apparatus, an observation method, and a program to be used for observation by a radar, for example.

BACKGROUND ART

For example, for observing objects to be observed at a radar, there is employed a method in which a beam direction of an antenna beam is rotated by rotation of an antenna or the like and intensity of received electric field signals from the antenna is observed.

Conventionally, there is known a method of determining a distribution function of radio wave sources by using a deconvolution method to thereby improve the resolution.

However, in the method using the deconvolution method, there is a problem that radio wave source information cannot be directly extracted because it is merely given as functional values with respect to an azimuthal angle.

In this view, the present inventor has proposed a method of directly determining radio wave source information by using Prony's method (see Patent Literature 1). In this method, the radio wave source information is extracted on the basis of both A and an argument $(-j\theta_0)$ of an exponential function $(A*\exp(-j\omega\theta_0))$ of a signal subjected to fitting by using Prony's method. Where "A" denotes an amplitude, "j" denotes an imaginary unit, "w" denotes a spatial frequency, and "$\theta_0$" denotes an azimuthal angle.

CITATION LIST

Patent Literature

Patent Literature 1: Japanese Patent Application Laid-open No. 2000-114850

DISCLOSURE OF INVENTION

Technical Problem

In the above-mentioned method proposed by the present inventor, there is a fear that if the signal-to-noise ratio (S/N ratio) is not sufficiently high, due to noise influence, information which is not the actual radio wave source cannot be distinguished from the actual radio wave source and is extracted and displayed.

In view of the above-mentioned circumstances, it is an object of the present invention to provide an observation apparatus, an observation method, and a program which enable to extract actual radio wave sources such that the actual radio wave sources can be distinguished from information which is not the actual radio wave sources even if the signal-to-noise ratio is not sufficiently high in radar observation and the like.

Solution to Problem

In order to accomplish the above-mentioned object, an observation apparatus according to an embodiment of the present invention includes: a signal processing unit that performs, on the basis of a received electric field signal from an antenna by which a beam is scanned within a predetermined azimuthal angle and a signal of an azimuthal angle of the scanned beam, a Fourier transform on a distribution function of the received electric field signal into a frequency domain of the azimuthal angle, divides (i.e., performs arithmetic division on) a signal according to a first spectral function by a signal according to a second spectral function, the first spectral function being obtained by performing the Fourier transform, the second spectral function being obtained by performing a Fourier transform on an antenna pattern of the antenna into a frequency domain of the azimuthal angle, and subjects the divided signal to fitting by using Prony's method with exponential functions including real parts and imaginary parts in arguments. As will be apparent to those skilled in the art, the signal processing unit discussed herein can be a processor (or processors) of a computing device, and the processor (or processors) can be in operable communication with the antenna from which the signals are received.

A radio wave source distribution spectrum obtained through the deconvolution method is a Fourier transform of a distribution function of radio wave sources in terms of the azimuthal angle. It is possible to model the distribution of the radio wave sources in a case where it is the sum of a multiple of discrete radio wave sources. Each of the discrete radio wave sources can be considered as a point wave source. Therefore, the Fourier transform of it is represented by an exponential function whose amplitude is constant in the frequency domain. Therefore, the radio wave source distribution spectrum is represented as the sum of such exponential functions. Therefore, the information on the radio wave source distribution can be directly obtained by using the method disclosed in Patent Literature 1, i.e., by extracting exponential function components from the radio wave source distribution spectrum by using Prony's method.

However, in an apparatus in the reality, a noise spectrum overlaps a radio wave source distribution spectrum, and thus the extracted exponential function components include exponential function components caused by noise. The amplitude of the exponential function components caused by arriving actual radio waves is constant. Meanwhile, the amplitude of the exponential function caused by noise is not necessarily constant.

According to the knowledge of the present inventor, it has been found that in a case of performing fitting by using Prony's method with the exponential functions including the real part and the imaginary part in the argument when extracting exponential function components from the radio wave source distribution spectrum, the real part of the exponential function is 0 if the amplitude of the exponential function is constant, but the real part of the exponential function is not 0 if the amplitude of the exponential function is not constant. In other words, it has been found that whether it is the exponential functions caused by arriving actual radio waves or the exponential functions caused by noise can be identified on the basis of the values of the real parts of the arguments of the extracted exponential function components.

Therefore, in accordance with the present invention, it is possible to extract actual radio wave sources such that the actual radio wave source can be distinguished from information which is not the actual radio wave sources even if the signal-to-noise ratio is not sufficiently high in radar observation and the like.

It is favorable that the signal processing unit extracts radio wave source candidates, whose absolute values of the real parts are equal to or smaller than a predetermined value, among radio wave source candidates obtained by the fitting.

It is favorable that the signal processing unit obtains information for determining actual radio wave sources among the extracted radio wave source candidates from the exponential functions.

It is more favorable that the information for determining the actual radio wave sources among the extracted radio wave source candidates includes values of relative amplitudes of the radio wave source candidates, values of the real parts, and values of the azimuthal angles.

It is favorable that the observation apparatus according to the present invention further includes a display unit that displays information on the extracted radio wave source candidates and information for determining the actual radio wave sources. As will be apparent to those skilled in the art, the display unit discussed herein can be a display.

It is favorable that the signal processing unit subjects the divided signal to low-pass filtering before fitting is performed by using Prony's method.

It is favorable that the observation apparatus according to the present invention further includes an antenna system, such as an antenna system including a beam antenna with an antenna rotating device that rotates the beam antenna, an antenna system with an electronic antenna beam scan apparatus, or an antenna system including a beam antenna with an antenna movement apparatus that moves the beam antenna, as the antenna in which the beam is scanned within the predetermined azimuthal angle.

It is favorable that the observation apparatus according to the present invention further includes: a transmitter that supplies the antenna with transmitted electric power; and a switch unit that performs switching between transmitting and receiving. As will be apparent to those skilled in the art, the switch unit discussed herein can be a switch, and the transmitter that is disclosed as supplying the antenna with transmitted electric power can be a wireless power transmitter.

An observation method according to an embodiment of the present invention includes: a step of performing, on the basis of a received electric field signal from an antenna by which a beam is scanned within a predetermined azimuthal angle and a signal of an azimuthal angle of the scanned beam, a Fourier transform on a distribution function of the received electric field signal into a frequency domain of the azimuthal angle; a step of dividing a signal according to a first spectral function obtained by performing the Fourier transform into a signal according to a second spectral function obtained by performing a Fourier transform on an antenna pattern of the antenna into a frequency domain of the azimuthal angle; and a step of subjecting the divided signal to fitting by using Prony's method with exponential functions including real parts and imaginary parts in arguments.

A program according to an embodiment of the present invention causes a computer to execute: a step of performing, on the basis of a received electric field signal from an antenna by which a beam is scanned within a predetermined azimuthal angle and a signal of an azimuthal angle of the scanned beam, a Fourier transform on a distribution function of the received electric field signal into a frequency domain of the azimuthal angle; a step of dividing a signal according to a first spectral function by a signal according to a second spectral function, the first spectral function being obtained by performing the Fourier transform, the second spectral function being obtained by performing a Fourier transform on an antenna pattern of the antenna into a frequency domain of the azimuthal angle; and a step of subjecting the divided signal to fitting by using Prony's method with exponential functions including real parts and imaginary parts in the arguments.

Advantageous Effects of Invention

In accordance with the present invention, it is possible to extract actual radio wave sources such that the actual radio wave source can be distinguished from information which is not the actual radio wave sources even if the signal-to-noise ratio is not sufficiently high in radar observation and the like.

MODE(S) FOR CARRYING OUT THE INVENTION

Hereinafter, an embodiment of the present invention will be described with reference to the drawings.

Figure 1:
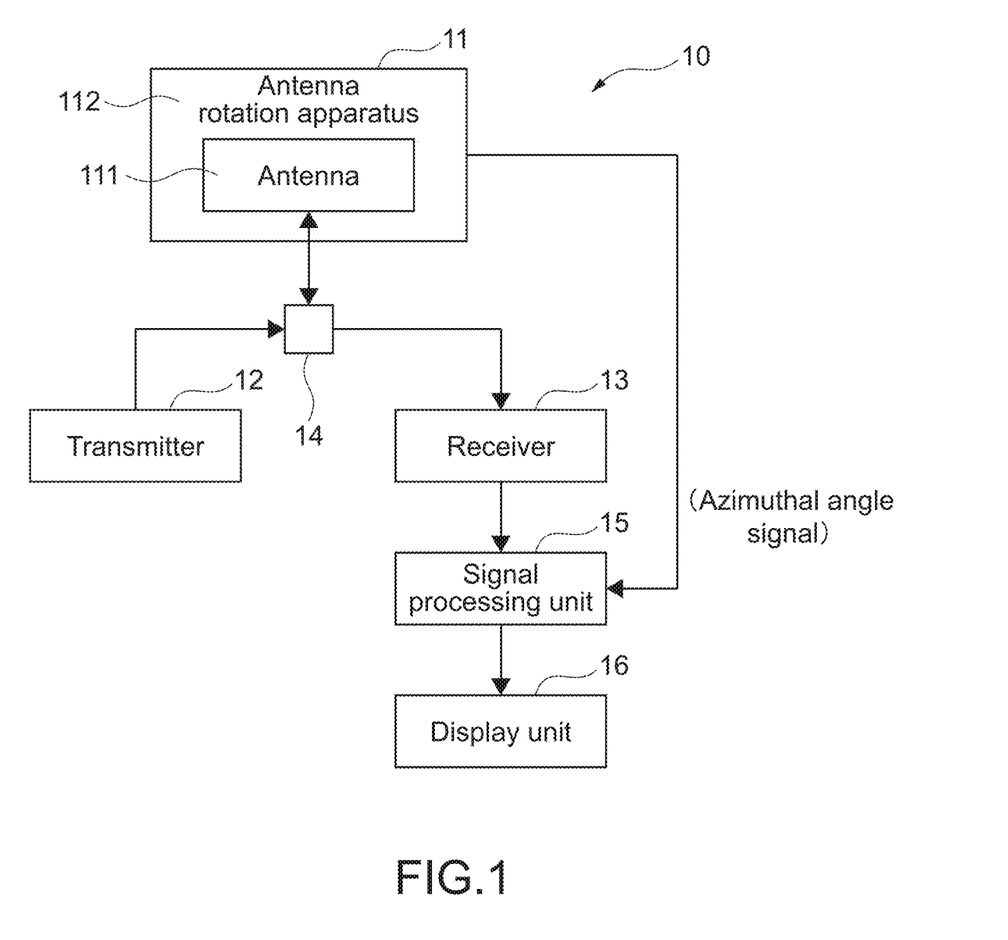
FIG. 1 A block diagram showing an observation apparatus according to an embodiment of the present invention.

FIG. 1 is a block diagram showing an observation apparatus according to the embodiment of the present invention. In this embodiment, the observation apparatus according to the present invention is applied to a radar apparatus.

As shown in FIG. 1, an observation apparatus 10 includes an antenna system 11, a transmitter 12, a receiver 13, a switch unit 14, a signal processing unit 15, and a display unit 16.

The observation apparatus 10 is a radar apparatus. The observation apparatus 10 is an apparatus that sends radio waves toward targets and observes reflected waves thereof to thereby measure directions and the like of the targets.

The antenna system 11 scans an antenna beam in a predetermined direction. The antenna system 11 includes a beam antenna 111 and an antenna rotation apparatus 112 that rotates the beam antenna 111. The antenna rotation apparatus 112 rotates the beam antenna 111 in a direction in which the resolution of the beam antenna 111 is to be improved. The antenna system 11 outputs a signal of an azimuthal angle according to rotation of the antenna rotation apparatus 112, that is, an azimuthal angle of a beam scanned. Any antenna including a dipole-based antenna, a horn antenna, a parabolic antenna, an array antenna, and the like can be used as the beam antenna.

The transmitter 12 supplies the beam antenna 111 with transmitted electric power.

The receiver 13 transforms received radio waves of the beam antenna 111 into electric field signals.

The switch unit 14 switches between transmitting and receiving.

The signal processing unit 15 inputs the received electric field signals from the receiver 13 via the switch unit 14 and the signals of the azimuthal angle from the antenna system 11, performs predetermined signal processing, and outputs information regarding radio wave source candidates, the relative amplitudes, and values of real parts and positions (azimuthal angle) of the radio wave source candidates and the like. The real parts are to be described later.

On the basis of the output from the signal processing unit 15, the display unit 16 displays information regarding the relative amplitude values, the azimuthal angles, and the like of the information regarding the relative amplitudes, the values of the real parts and positions (azimuthal angles) of the radio wave source candidates.

Figure 2:
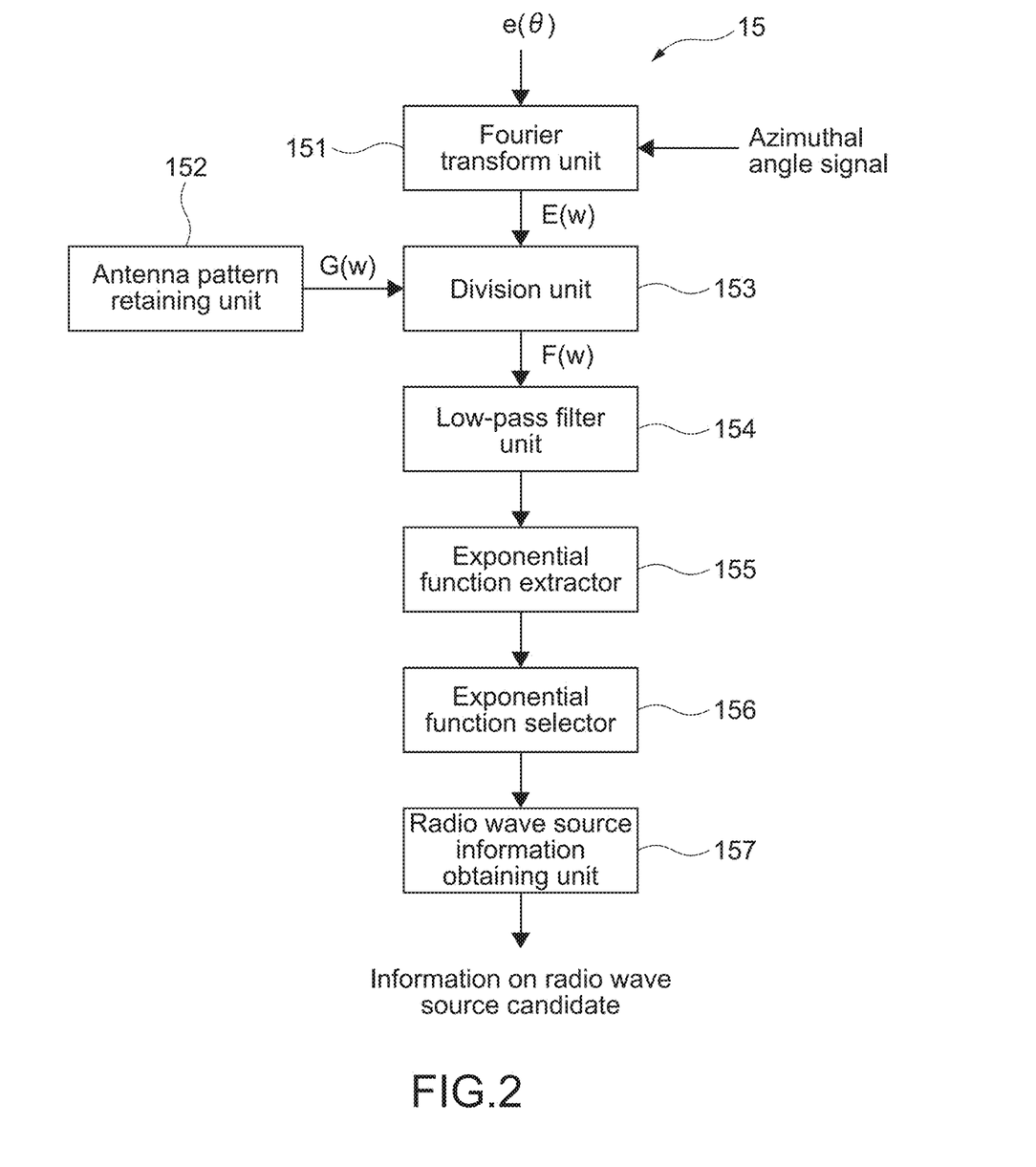
FIG. 2 A block diagram showing a configuration of a signal processing unit of the observation apparatus shown in FIG. 1.

FIG. 2 is a block diagram showing a configuration of the above-mentioned signal processing unit 15.

As shown in FIG. 2, the signal processing unit 15 includes a Fourier transform unit 151, an antenna pattern retaining unit 152, a division unit 153, a low-pass filter unit 154, an exponential function extractor 155, an exponential function selector 156, and a radio wave source information obtaining unit 157.

The Fourier transform unit 151 determines a spectral function $E(\omega)$ obtained by performing a Fourier transform on a distribution function $e(\theta)$ of a received electric field signal, which has been input, into a frequency domain of the azimuthal angle. Here, "θ" denotes an azimuthal angle and "ω" denotes a spatial frequency.

The antenna pattern retaining unit 152 retains a spectral function $G(\omega)$ obtained by performing a Fourier transform on the antenna pattern $g(\theta)$ of the beam antenna 111 into a frequency domain of the azimuthal angle. When the antenna to be used is determined, an antenna pattern $g(\theta)$ is also determined. Therefore, $G(\omega)$ can be determined by calculation using $g(\theta)$. In general, the antenna pattern $g(\theta)$ is measured as an antenna-received electric field in the presence of one point wave source. $G(\omega)$ can be determined by performing a Fourier transform on a received electric field pattern (antenna pattern $g(\theta)$) in the presence of one point wave source of this antenna into a frequency domain of the azimuthal angle.

The division unit 153 divides a signal according to the spectral function $E(\omega)$ by a signal of according to the spectral function $G(\omega)$. The division value is a signal according to a spectral function $F(\omega)$ obtained by performing a Fourier transform on the radio wave source into a frequency domain of the azimuthal angle. That is, the division unit 153 determines $$F(\omega)=E(\omega)/G(\omega)$$

The low-pass filter unit 154 performs low-pass filtering on the output signals from the division unit 153. As the spatial frequency band physically exists in the signal obtained by performing a Fourier transform on the received electric field pattern of the antenna, it cannot have components beyond band. However, division signals (radio wave source distribution spectrum) obtained by performing signal processing by the division unit 153 includes frequency components beyond the band. It is generated due to a difference between actual processing and ideal processing. When performing processing the signal which has the components beyond the band at a subsequent stage, the signal is deteriorated. Therefore, here, low-pass filtering is performed to remove signal components beyond the band, such that the deterioration of the signal is inhibited.

Here, radio wave sources observed by the radar can be considered as a set of discrete scatterers. The distribution function of the radio wave source can be represented by an expression as follows. Where "M" denotes the number of radio wave sources.

$$f(\theta) = \sum_{i=1}^{M} A_i \delta(\theta - \theta_i) \qquad \text{[Expression 1]}$$

Therefore, when $F(\omega)$ observed by the radar is subjected to fitting by using Prony's method with the exponential functions including the real parts and the imaginary parts in the arguments, the spectral function $F(\omega)$ is as follows. Where "N" denotes the number of observed data.

$$F(\omega) = \sum_{i=1}^{N/2} A_i \exp\{(\alpha_i - j\theta_i)\omega\} \qquad \text{[Expression 2]}$$

It is different from the method disclosed in Patent Literature 1 in that the spectral function $F(\omega)$ includes a real part $\alpha_i$ in the argument. That is, with Prony's method according to the present invention, $\alpha_i$ is also output in addition to $A_i$ and $\theta_i$.

$\alpha_i$ corresponding to the actual radio wave source (target) is ideally 0. Actually, that value is not necessarily 0 but it is a small value. Meanwhile, $\alpha_i$ corresponding to noise is an arbitrary value. That value can be small or large in a manner that depends on cases. The method according to the present invention utilizes this point. In method according to the present invention, noise influence is reduced by setting a threshold on the value of $\alpha_i$ and using $A_i$ and $\theta_i$ in the case that $\alpha_i$ is equal to or smaller than the threshold.

The exponential function extractor 155 subjects signals obtained by being divided by the division unit 153 and subjected to low-pass filtering to fitting by using Prony's method with the exponential functions including the real part $\alpha_i$ and the imaginary part $j\theta_i$ in the argument $(\alpha_i - j\theta_i)$.

The exponential function selector 156 sets a threshold (e.g., 0.01 as an absolute value) on the value of $\alpha_i$ in advance and selects discrete exponential functions (radio wave source candidates) with $\alpha_i$ equal to or smaller than the threshold.

The radio wave source information obtaining unit 157 obtains radio wave source information from the exponential functions selected by the exponential function selector 156. The radio wave source information is information for determining actual radio wave sources from the radio wave source candidates, such as value of the relative amplitude, the real part, the position (azimuthal angle), and the like of the respective radio wave source information.

Next, an operation of the thus configured observation apparatus 10 will be described.

While the beam antenna 111 is being rotated by the antenna rotation apparatus 112, the electric power is supplied to the beam antenna 111 from the transmitter 12 and the radio waves are sent from the beam antenna 111.

When the radio waves sent from the beam antenna 111 are reflected on scatterers (targets) and are returned, the beam antenna 111 outputs the received radio waves. The received radio waves via the switch unit 14 are transformed into an received electric field signal by the receiver 13. Then, the transformed radio waves are input into the signal processing unit 15.

At the signal processing unit 15, the following signal processing is performed.

Determine the spectral function $E(\omega)$ obtained by performing a Fourier transform on the distribution function $e(\theta)$ of the received electric field signal into a frequency domain of the azimuthal angle.

Divide the signal according to this spectral function $E(\omega)$ by the signal of the spectral function $G(\omega)$ obtained by performing a Fourier transform on the antenna pattern $g(\theta)$ of the beam antenna 111 into a frequency domain of the azimuthal angle.

Perform low-pass filtering on the division signal.

Subject the signal subjected to low-pass filtering to fitting by using Prony's method with the exponential functions including the real part $\alpha_i$ and the imaginary part $j\theta_i$ in the argument $(a_i - j\theta_i)$.

Set the value of $\alpha_i$ for the threshold in advance and select the discrete exponential functions (radio wave source candidates) of $\alpha_i$ equal to or smaller than the threshold.

Obtain the radio wave source information from the selected exponential functions.

The information on the values of the relative amplitudes of the respective radio wave source candidates, the values of the real parts, the values of the positions (azimuthal angles), and the like is displayed by the display unit 16. The display unit 16 displays these pieces of information in the form of a table or the like.

Next, results of numerical simulation performed for confirming the effects according to the present invention will be described.

An aperture antenna (antenna beam width: 5 degrees), with uniform distribution whose length is 10.16 times as large as the wavelength was used as the antenna according to the present invention. While rotating this antenna from −90 degrees to +90 degrees, radio waves were sent. Then, the radio waves were scattered by point scatterers which are identical in terms of radio waves and are located in directions of −2.5 degrees and +2.5 degrees at an equal distance from the antenna. The radio waves returned to this antenna were obtained in an environment where the signal-to-noise ratio was 10 dB. A radio wave source information obtained in this case was reviewed.

Figure 3:
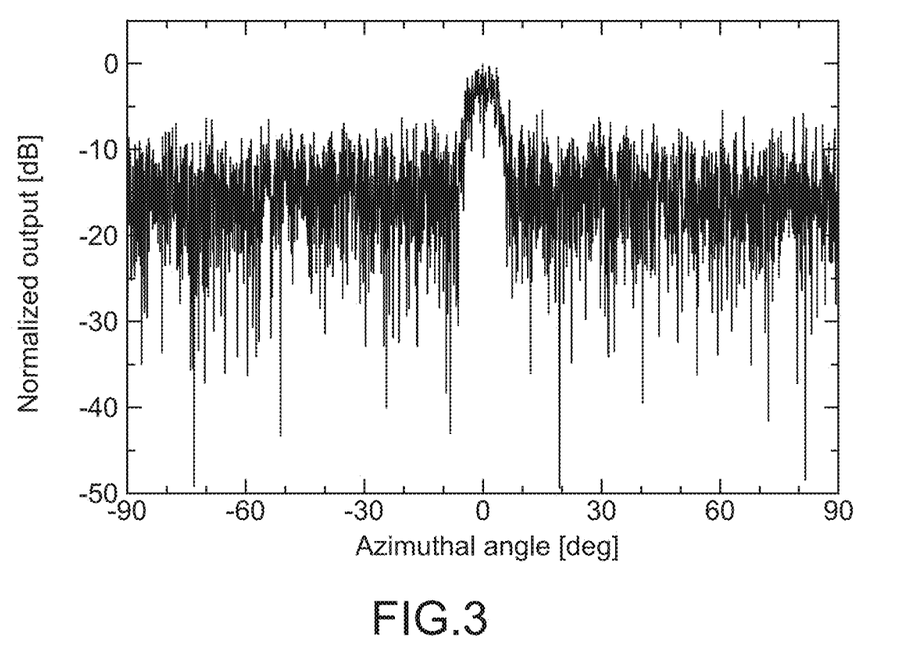
FIG. 3 A graph showing logarithmic display of $\{e(\theta)\}^2$ of the distribution function of the received electric field signal $e(\theta)$ according to the embodiment of the present invention.

Logarithmic display of $\{e(\theta)\}^2$ of the distribution function $e(\theta)$ of the received electric field signal is shown in FIG. 3.

Figure 4:
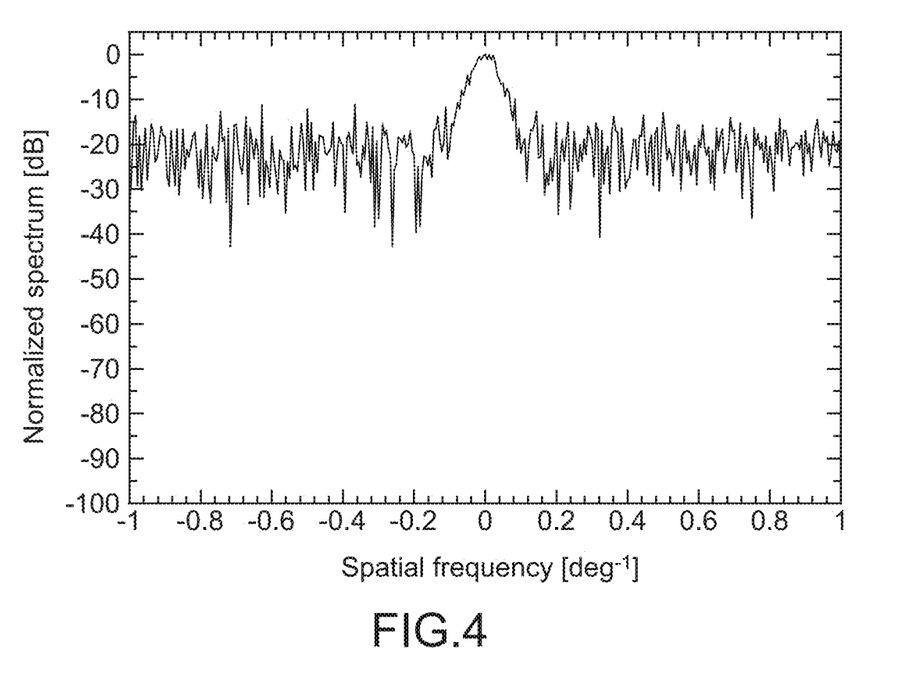
FIG. 4 A graph showing $\{E(\omega)\}^2$ of the spectral function $E(\omega)$ obtained by performing a Fourier transform on $\{e(\theta)\}^2$ into a frequency domain of the azimuthal angle according to the embodiment of the present invention.

$\{E(\omega)\}^2$ of the spectral function $E(\omega)$ obtained by performing a Fourier transform on $\{e(\theta)\}^2$ into a frequency domain of the azimuthal angle is shown in FIG. 4.

Figure 5:
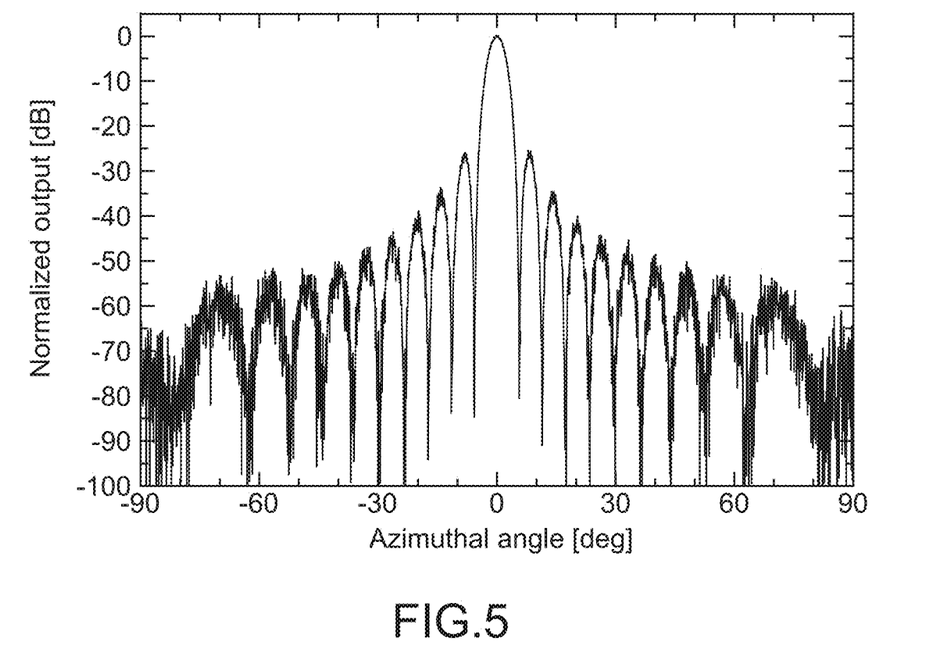
FIG. 5 A graph showing logarithmic display $\{g(\theta)\}^2$ of the antenna pattern $g(\theta)$ of the antenna according to the embodiment of the present invention.

Logarithmic display of $\{g(\theta)\}^2$ of the antenna pattern $g(\theta)$ of the antenna is shown in FIG. 5.

Figure 6:
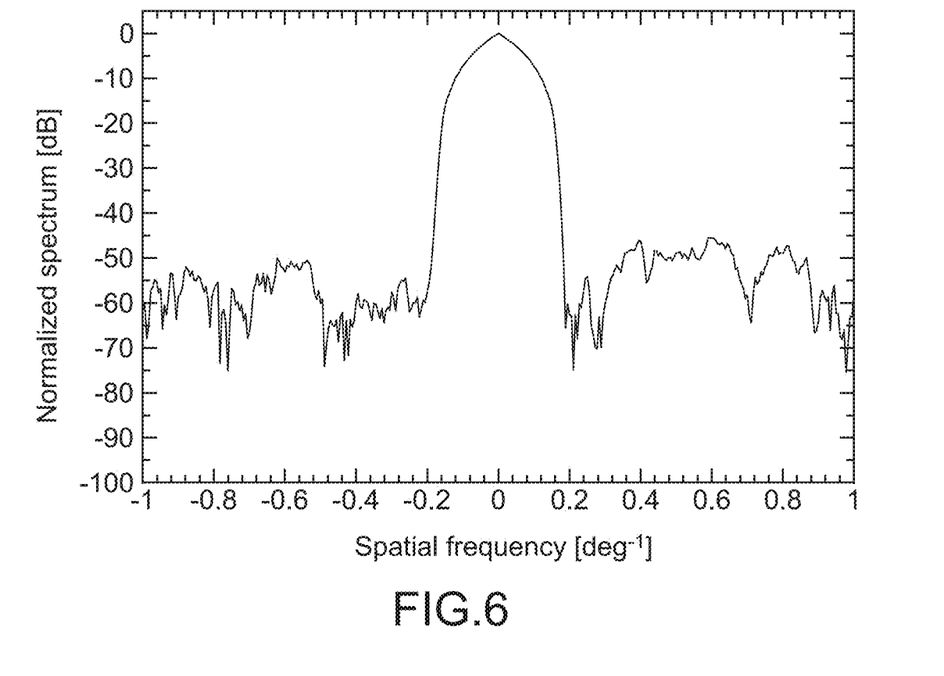
FIG. 6 A graph showing $\{G(\omega)\}^2$ of the spectral function $G(\omega)$ obtained by performing a Fourier transform on $\{g(\theta)\}^2$ into a frequency domain of the azimuthal angle according to the embodiment of the present invention.

$\{G(\omega)\}^2$ of the spectral function $G(\omega)$ obtained by performing a Fourier transform on $\{g(\theta)\}^2$ into a frequency domain of the azimuthal angle is shown in FIG. 6.

Figure 7:
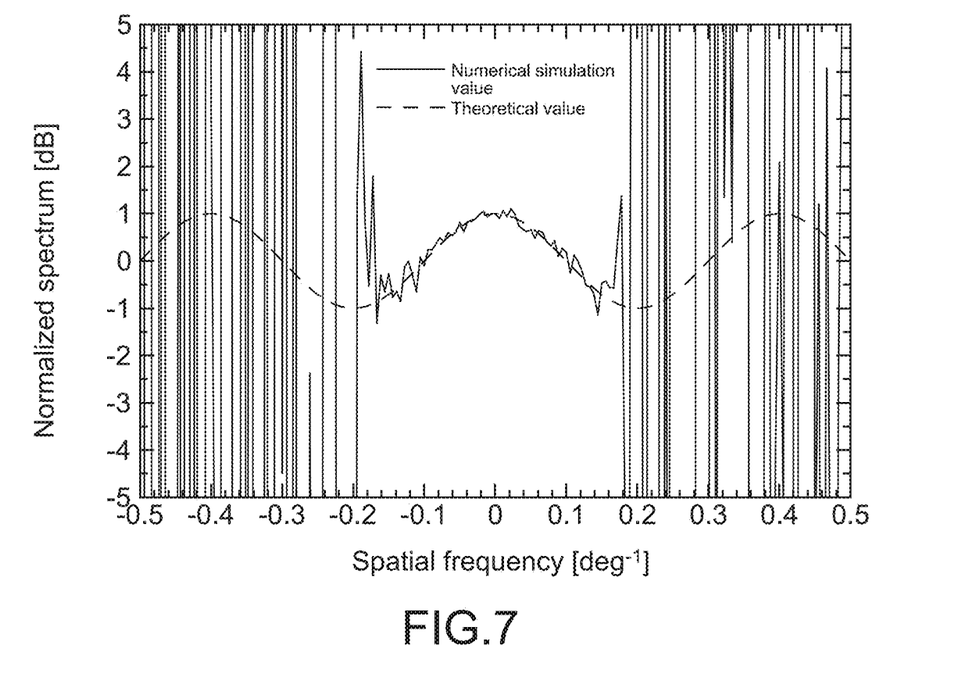
FIG. 7 A graph showing $F(\omega)$ determined by $E(\omega)/G(\omega)$ according to the embodiment of the present invention.

$F(\omega)$ determined by $E(\omega)/G(\omega)$ is shown in FIG. 7. The low-pass filter passes signals within 0.15 (degrees$^{-1}$), for example, with the absolute value in this frequency domain in FIG. 7.

$F(\omega)$ subjected to low-pass filtering is subjected to fitting by using Prony's method with the exponential functions including the real part $\alpha_i$ and the imaginary part $j\theta_i$ in the argument $(\alpha_i - j\theta_i)$. The exponential functions of cu equal to or smaller than 0.01 as an absolute value, which is a threshold of the real part $\alpha_i$, are selected. The radio wave source information of the selected exponential functions is shown in Table 1.

TABLE 1

| | Relative amplitude | Relative amplitude [dB] | αi | Position [deg] |
|---|---|---|---|---|
| 1 | 1.000E+00 | 0.000 | −0.001 | −2.253 |
| 2 | 8.343E−01 | −0.787 | −0.002 | 2.618 |
| 3 | 3.102E−02 | −15.084 | −0.001 | 35.218 |
| 4 | 3.003E−02 | −15.225 | −0.005 | 19.933 |
| 5 | 1.700E−02 | −17.694 | −0.006 | −83.908 |
| 6 | 1.174E−02 | −19.302 | −0.005 | 60.132 |
| 7 | 8.855E−03 | −20.528 | −0.002 | −68.564 |
| 8 | 2.761E−03 | −25.589 | −0.006 | −11.999 |

Figure 8:
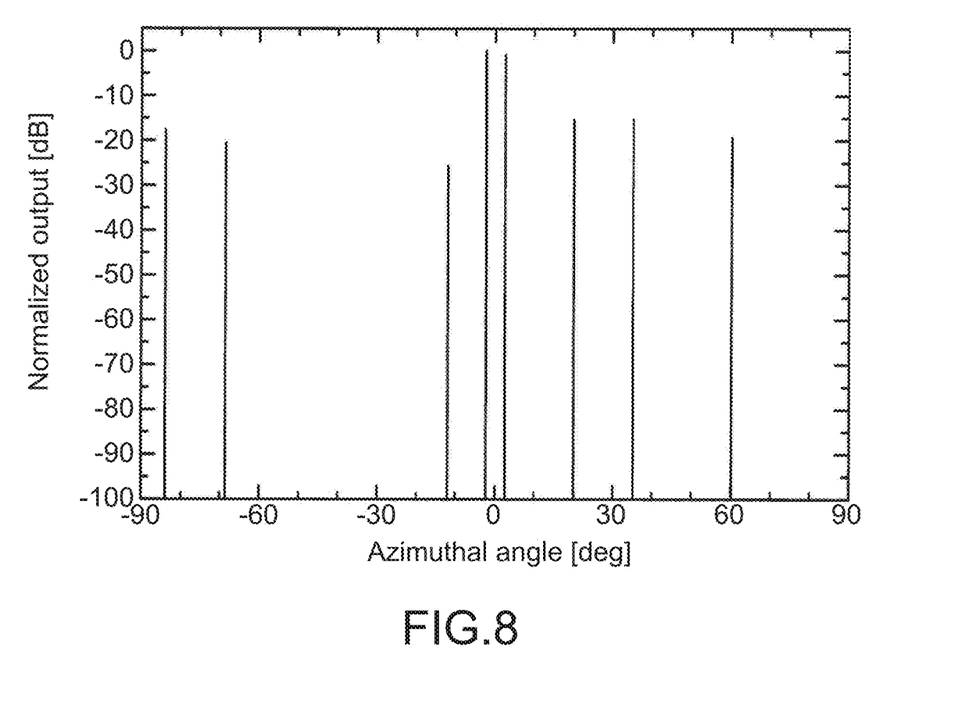
FIG. 8 A graph showing an example of a simulation result of the radio wave source information according to the embodiment of the present invention.

The actual simulation result of the radio wave source information shown in Table 1 is shown in FIG. 8.

Accordingly, it can be seen that the radio wave sources having substantially the same intensity are located in two directions closer to the actual radio wave source positions on the basis of the radio wave information source obtained in accordance with the present invention. Further, information indicating the presence of (here, six) radio wave sources in directions away from these directions is also shown. However, the intensity is lower by about 15 dB or more, and thus it can be determined as being caused by noise.

Figure 9:
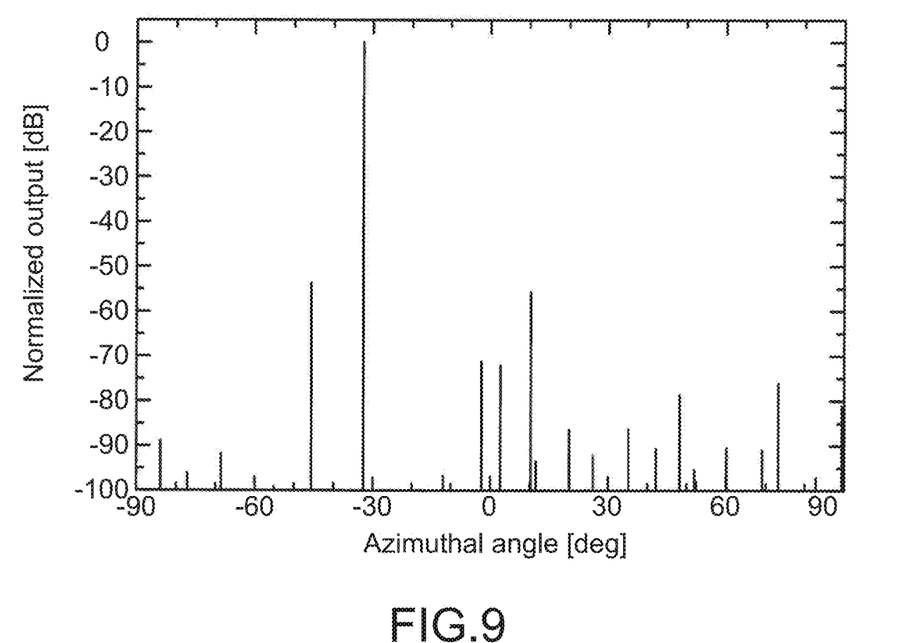
FIG. 9 A graph showing an example of the simulation result of the radio wave source information according to the method shown in Patent Literature 1.

As a comparative example, in accordance with the method shown in Patent Literature 1, results when numerical simulation is performed in the manner similar to the above-mentioned one are shown in Table 2. Moreover, an actual simulation result of the radio wave information source shown in Table 2 is shown in FIG. 9.

TABLE 2

| | Relative amplitude | Relative amplitude [dB] | αi | Position [deg] |
|---|---|---|---|---|
| 1 | 1.000E+00 | 0.000 | 0.178 | −32.504 |
| 2 | 4.106E−06 | −53.866 | 0.069 | −45.713 |
| 3 | 2.614E−06 | −55.828 | 0.056 | 10.327 |
| 4 | 7.534E−08 | −71.230 | −0.001 | −2.253 |
| 5 | 6.286E−08 | −72.016 | −0.002 | 2.618 |
| 6 | 2.403E−08 | −76.192 | 0.026 | 73.329 |
| 7 | 1.341E−08 | −78.724 | 0.014 | 48.223 |
| 8 | 7.510E−09 | −81.244 | 0.013 | 89.354 |
| 9 | 2.337E−09 | −86.314 | −0.001 | 35.218 |
| 10 | 2.262E−09 | −86.454 | −0.005 | 19.933 |
| ~ | | | | |
| 29 | 2.925E−11 | −105.338 | −0.098 | −16.757 |

In accordance with the radio wave source information according to the present invention, information on six radio wave sources other than the actual radio wave sources is shown. However, these six radio wave sources have amplitudes lower than that of the radio wave source having highest intensity by 15 dB or more, and thus it can be determined as being caused by noise. In contrast, in the method shown in Patent Literature 1, a single radio wave source having very high intensity near −30 degrees can be confirmed. Although the information corresponding to the actual radio wave sources is also output, the intensity of the amplitude is lower by 70 dB or more. Also, regarding other information, the intensity of the amplitude is smaller by 50 dB or more, and thus it is concluded that no radio wave sources are present in an area other than in the vicinity of −30 degrees.

That is, in the method shown in Patent Literature 1, a phenomenon that the amplitude with respect to noise is higher than the amplitude with respect to an object that corresponding to actual radio sources to be observed and erroneous results are dominant occurs. In contrast, in the method according to the present invention, the value of the real part $\alpha_i$ of the argument $(\alpha_i-j\theta_i)$ of the exponential function of $F(\omega)$ corresponding to targets is ideally 0. Actually, it is not necessarily 0 but it may be a small value. Meanwhile, the value of $\alpha_i$ corresponding to noise is an arbitrary value. It can be a small value or can be a large value. In the method according to the present invention, this point is utilized. By setting the threshold on the value of the real part $\alpha_i$ and extracting the exponential function of $F(\omega)$ with respect to the real part $\alpha_i$ equal to or smaller than the threshold, noise influence can be reduced.

The present invention is not limited only to the above-mentioned embodiment, various modifications can be made, and those fall within the range of the technical ideas of the present invention.

The above-mentioned embodiment has been described as one using a mechanical antenna rotating device as means for moving a pointing direction of the antenna beam toward radio wave sources to be observed. Alternatively, an electronic antenna beam scanning means, means for moving an antenna beam as mounted on a mobile platform such as an aircraft or satellite, or the like can be used as the means for moving the pointing direction of the antenna beam.

Further, in the above-mentioned embodiment, the observation apparatus includes the antenna system, the display unit, and the like. Alternatively, the observation apparatus may be configured to input electric field signals and signals received from an external antenna system. Further, the observation apparatus may be configured to output information to an external display apparatus and cause the display apparatus to display the information. Alternatively, without displaying the information, the observation apparatus may perform predetermined determination processing on the basis of the radio wave source information by using the exponential functions.

Further, in the above-mentioned embodiment, the antenna pattern retaining unit retains the spectral function $G(\omega)$ obtained by performing a Fourier transform on the antenna pattern $g(\theta)$ of the beam antenna into a frequency domain of the azimuthal angle. However, in a case where the antenna pattern $g(\theta)$ of the beam antenna dynamically varies, it may be configured to input it every time when it does and calculate the spectral function $G(\omega)$.

The threshold of the real part $\alpha_i$ exemplified in the above-mentioned embodiment may be adaptively variable.

REFERENCE SIGNS LIST

10 observation apparatus
11 antenna system
12 transmitter
13 receiver
14 switch unit
15 signal processing unit
16 display unit
151 Fourier transform unit
152 antenna pattern retaining unit
153 division unit
154 low-pass filter unit
155 exponential function extractor
156 exponential function selector
157 radio wave source information obtaining unit

The invention claimed is:

1. An observation apparatus, comprising:
an antenna system comprising an antenna; and
a processor in operable communication with the antenna, wherein the processor
performs, on a basis of an electric field signal received from the antenna by which a beam is scanned within a predetermined azimuthal angle and a signal of an azimuthal angle of the scanned beam, a Fourier transform on a distribution function of the received electric field signal into a frequency domain of the azimuthal angle,
performs arithmetic division on a first signal to give a divided signal by dividing the first signal according to a first spectral function by a second signal according to a second spectral function, the first spectral function being obtained by performing the Fourier transform on the distribution function of the received electric field signal, the second spectral function being obtained by performing a Fourier transform on an antenna pattern of the antenna into a frequency domain of the azimuthal angle, and
subjects the divided signal to fitting by using Prony's method with exponential functions including real parts and imaginary parts in arguments.

2. The observation apparatus according to claim 1, wherein
the processor extracts radio wave source candidates of radio wave source candidates obtained by the fitting, the radio wave source candidates each having an absolute values of the real parts, the absolute value being equal to or less than a predetermined value.

3. The observation apparatus according to claim 2, wherein
the processor obtains information for determining actual radio wave sources from the extracted radio wave source candidates on a basis of the exponential functions.

4. The observation apparatus according to claim 3, wherein
the information for determining the actual radio wave sources from the extracted radio wave source candidates includes values of relative amplitudes of the radio wave source candidates, values of the real parts, and values of the azimuthal angles.

5. The observation apparatus according to claim 3, further comprising
   a display in operable communication with the processor, wherein the display displays information on the extracted radio wave source candidates and information for determining the actual radio wave sources.

6. The observation apparatus according to claim 1, wherein
   the processor subjects the divided signal to low-pass filtering before fitting is performed by using Prony's method.

7. The observation apparatus according to claim 1, wherein:
   the antenna is a beam antenna and the antenna system comprises an antenna rotating device that rotates the beam;
   the antenna system comprises an electronic antenna beam scan apparatus; or
   the antenna is a beam antenna and the antenna system comprises an antenna movement apparatus that moves the beam antenna.

8. The observation apparatus according to claim 1, further comprising:
   a power transmitter that supplies the antenna with electric power; and
   a switch that performs switching between transmitting and receiving.

9. An observation method, comprising:
   using an antenna to scan a beam within a predetermined azimuthal angle to generate an electric field signal;
   receiving, by a processor in operable communication with the antenna, the electric field signal;
   performing, on a basis of the received electric field signal from the antenna by which the beam is scanned within the predetermined azimuthal angle and a signal of an azimuthal angle of the scanned beam, a Fourier transform on a distribution function of the received electric field signal into a frequency domain of the azimuthal angle;
   performing arithmetic division on a first signal to give a divided signal by dividing the first signal according to a first spectral function by a second signal according to a second spectral function, the first spectral function being obtained by performing the Fourier transform on the distribution function of the received electric field signal, the second spectral function being obtained by performing a Fourier transform on an antenna pattern of the antenna into a frequency domain of the azimuthal angle; and
   subjecting the divided signal to fitting by using Prony's method with exponential functions including real parts and imaginary parts in arguments.

* * * * *